June 7, 1927.
J. C. PETERSON
SNAP FASTENER
Filed April 10, 1922
1,631,602
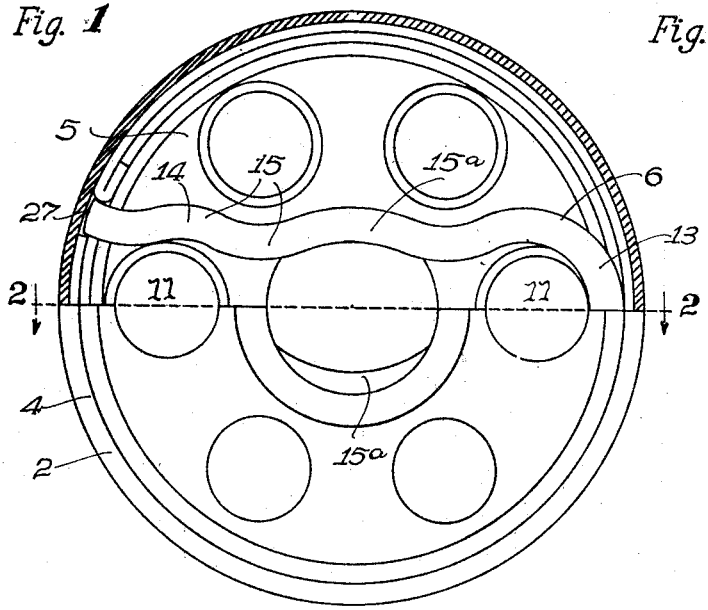
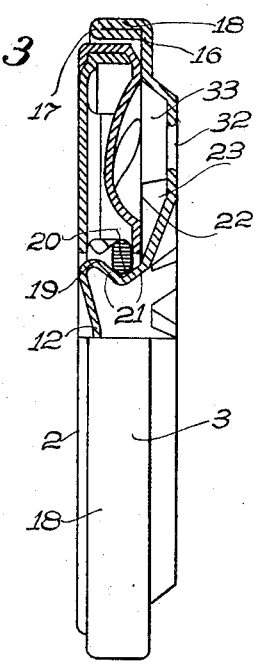
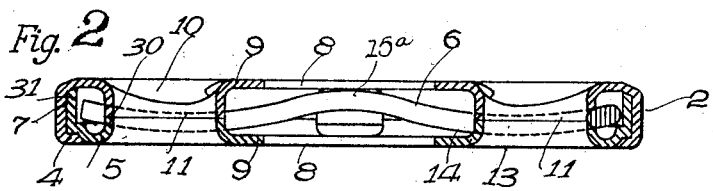
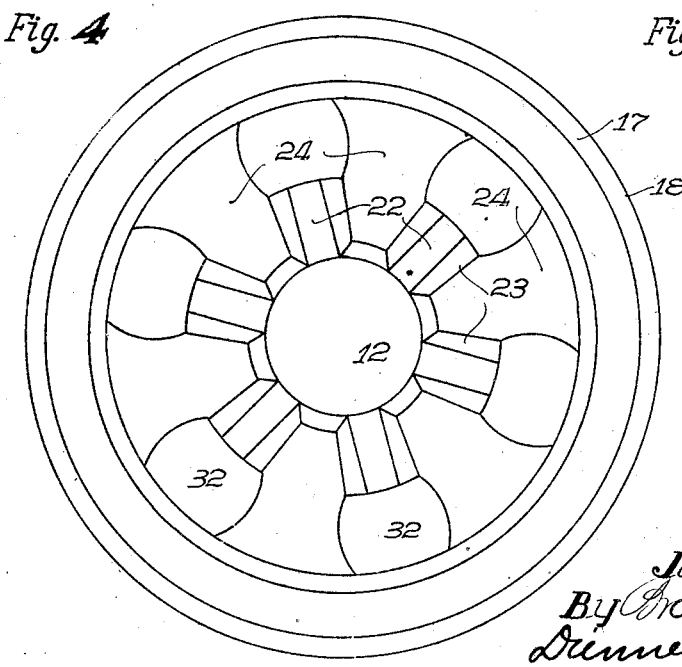
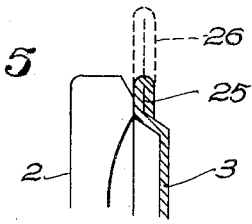
Inventor:
Julius C. Peterson
By Brown Bartlett
Dunner Attorneys Patented June 7, 1927.

1,631,602

UNITED STATES PATENT OFFICE.

JULIUS C. PETERSON, OF ELGIN, ILLINOIS.

SNAP FASTENER.

Application filed April 10, 1922. Serial No. 551,167.

My invention relates to snap-fasteners for securing together articles of a detachable character, such as wearing apparel where a quick and expedient method of fastening the various parts together is essential, or where a similar arrangement is desirable in attaching a sweat band to a hat.

Heretofore, snap-fasteners in general have been unsatisfactory and have created no little trouble in their use. It is desirable that they occupy as little space as possible, in order to bring the parts thus fastened closely together, and to prevent bulging.

Usually each member of the fastener is sewed in place. This task is tedious because the members have to be aligned and equidistantly spaced in order that the co-operating one will come in proper register. Hence, it is not customary to remove the fasteners from the garments before washing. The result is that the wringer and mangle play havoc with the fastener and generally render it useless, or partially crush it, so that its action is unreliable.

It is the object of the present invention to overcome these difficulties by providing a snap-fastener which is of substantial construction, capable of resisting the crushing strains to which it is subjected, without direct contact of the wringer and mangle with the interengaging holding parts, and of securely holding together the parts secured by it, and which will be very flat.

To this end, the stud is strongly supported within the center of the stud carrying member, and a circumferential flange provided to serve as a protector against crushing action of the wringer. The flange further serves to house the socket member, when the members of the fastener are in engaged relation. The fastener occupies very little space and allows the garments carrying the fastener to be fastened closely together.

I have provided a spring of novel character, which is anchored within the housing of the socket member, so that it lies in the path of the inserted stud. The relation is such that the spring displaces itself sufficiently to allow removal of the stud, by an application of a very small force; yet, accidental removal is effectively prevented.

A further object of my invention is the provision of a snap-fastener of simple, durable and rigid construction, of low cost, which will be capable of positive action, and which will be reliable and efficient in use.

In order that those skilled in the art may be fully acquainted with the nature and scope of my invention, I shall now describe a specific embodiment of the invention in connection with the accompanying drawings which form part of the present specification.

In the drawings:

Figure 1, is a top plan view of the socket member, with part of the top cut away to show part of the spring;

Figure 2 is a section taken on line 2—2 of Figure 1;

Figure 3 is a view of the device showing the two members in engaged relation, being partly in section to illustrate the stud;

Figure 4 is a top plan view of the stud member; and

Figure 5 is a fragmentary detail of a modified form of snap-fastener.

The device comprises a socket member 2 and a stud member 3, the former being disposed within the latter and being arranged to lie in approximately the same plane. This permits the articles secured by these two members to lie as closely together as possible, which is very desirable when securing sweat bands in hats by use of this form of snap-fastener.

The socket member 2 comprises the discs 4 and 5, which co-operate in forming a housing in which the U-shaped spring 6 is confined. The periphery of the disc 4 is provided with a rim 7, preferably being formed by turning the edge downward and then bending radially inward a short distance to meet the disc 5. The disc 5 has a rim fitting closely within the rim 7 of disc 4.

Each disc 4 and 5 has a central opening 8 therein, which is formed by removing the central portions of said discs. The side of the disc, which forms the face of the socket member 2 that opposes the stud member 3, is provided with an annular depression or groove 10 between the flange 9 and outer peripheral edge. A plurality of holes 11 equidistant from each other, extend through the socket member 2, their upper edges lying within the groove 10. The flat face 13 of the disc 5 engages the article to which the socket member 2 is sewed. The thread is passed into and out of the various holes 11 and, with the groove 10 provided, the thread will not bulge beyond the plane of the socket member but will be accommodated within the thickness thereof. The edges of the holes 11 are turned inwardly to present a smooth surface to the thread to prevent abrading or cutting by the exposed sharp edges provided in the old construction.

The stud 12 of the stud member 3 is adapted to enter the hole 8, being of such diameter as to clear the marginal flange 9 of the disc 5. The spring 6 is of U-formation, the bend or curved portion 13 encircling an opening 11, while the legs 14 extend diametrically across, clearing the opposite opening 11 with the ends thereof lodged in the cut 27 in the upstanding rim 31 of the disc 5. The legs 14 of the spring 6 are formed with waves 15 therein, that is, tortuous or sinuous in two planes and arranged so that the wave 15$^a$ of each leg will extend into the opening 8. As the spring 6 is substantially anchored in the housing, the stud 12 in entering the hole 8 must engage and displace the waves 15$^a$ far enough to permit complete entry. After that, the central portions of the legs of the spring 6 will return to their former positions because of the resiliency of the spring 6. Thus the stud 12 will be positively locked within the socket member.

The stud 12 is made integral with the stud member 3. The stud member 3 is preferably formed out of a single piece of material. The peripheral edge 16 is turned up at right angles to the member and bent back upon itself in order to provide a smooth rounded edge 17 and also to reinforce the flange 18 thus formed. The reinforced flange 18 serves to prevent crushing of the stud 12, when the garments are passed through a wringer or mangle even though the stud and socket members may be separated. The overall diameter of the member 3 is larger than that of the socket member, so that the latter may easily fit within the flange 18.

The member 3 is raised in the center to form the stud 12. A rounded rim 19 is provided on the stud 12, and is divided from the member 3 by a V-shaped groove 20, which receives the spring 6. The groove 20 is formed by the conical sides 21, the one adjacent to the rim 19 functioning to wedge the spring legs 14 apart, when the stud 12 is removed. The curvature of the rim 19 will cause the spring legs 14 to spread when the stud is inserted in the opening 8.

The stud 12 is strengthened by the raised ribs 22, reinforced by the sloping sides 23, and connected with the outer rim and flange 18 by the portions 24. Thus, the stud is substantially reinforced on all sides to prevent distortion. The stud member may be sewed through the openings 32 to the article carrying it similarly to the socket member 2, the thread lying below the plane of engagement of the members, so that parts will come into close contact.

It is to be noted that the construction described permits the socket member 2 and stud member 3 to lie exceedingly close together, occupying substantially the same width as that of a single member, because of the stud member 3 being designed to receive practically all of the socket member 2. It is further made possible by the manner of sewing each member to the respective garment, the depression 10 receiving the bulge of the thread, which passes through the holes 11. Likewise, the stud member 3 has the openings 32 formed so as to permit the thread sewing the stud member 3 to the garment, to lie within the space 33 without interfering with the thread securing the socket member 2 to the garment.

It is to be further noted that the particular design of the spring 6 has resulted in a locking arrangement which finds particular utility when employed in my device. The spring 6 is made out of a flattened wire, which is rounded at the edges, so that one of these edges lies in the V-shaped groove 20. The close line contact between the spring 6 and the stud 12 gives great holding power and ease of separation, the flexions, 15 and 15$^a$ of the spring legs 14 engaging and holding the stud in preference to the U flexion at the end of the spring, which arrangement is made possible by the free ends of the legs 14 being lodged in the cuts 27. The design of the spring 6 has reduced considerably the friction usually occurring between this member and the stud. The wave 15$^a$ engages the marginal flange 9 of the disc 4, and the surface of the wave 15$^a$, which engages the stud member 12, lies against the upper part of the conical face 21 on the stud. The spring legs 14 intersecting the aperture 8 are shaped to encompass the stud 12, and with the vertical flexions, engage the stud so as to insure ease of engagement and ease of disengagement without sacrificing durability.

The particular cut formed at the holes 11 is to be noted, as it not only forms a housing for the spring 6 and turns down the edges of the holes 11, so as to prevent abrading or cutting of the thread, but provides a very substantial construction with strength to resist an ordinary crushing strain. When there is a side pull placed upon the fastener, when its two members are fastened together the strain is taken up by the flange 7 engaging the reinforced flange 18 on the side opposite to the direction of the pull. This action relieves any strain upon the spring 6 which strain might cause such movement of the spring as to permit displacement of the stud 12.

The flexion 15$^a$, as just mentioned, engages the marginal flange 9. The ends of the spring legs 14 being securely held in place in the cuts 27, the spring 6 is not permitted to pivot itself so as to increase the surface engagement with the stud 12, which, if it should occur, is apt to create a binding action and hamper the ease of disengagement of the stud 12. The outer portion of the stud 12 does not project beyond the hole 8.

In Figure 5, I have shown a modified form of fastener wherein the flange 18 is omitted, the peripheral edge of the stud member 3 terminating in a short radial rim 25. I propose extending this rim, as indicated in dotted lines at 26, to provide means for attaching a supporting buckle to a sweat band, or for other purposes where a detachably attached article has an opening therein in which one member of the snap-fastener may be inserted and held there by two other members or the other member of said snap-fastener.

While I have shown and described one embodiment of my invention, it is obvious that changes involving omission, alteration, substitution and reversal of parts, and even changes in the mode of operation, may be made without departing from the scope of my invention, which is best defined in the following claims.

I claim:

1. In a snap fastener socket, in combination, spaced discs, registering sewing holes in said discs, and lips bent down around the edges of said holes to define tubular passageways through both discs.

2. In a snap fastener socket, in combination, spaced discs, registering sewing holes in said discs, and lips bent down around the edges of said holes into abutment to define tubular passageways through both discs.

3. In a snap fastener socket, in combination, spaced discs, registering sewing holes in said discs, and lips bent down around the edges of said holes into abutment.

4. In a snap fastener socket, in combination, spaced discs, one disc having an annular depression spaced from its periphery and the other being flat, said discs having a series of openings registering with each other and with said annular depression and edges bent toward each other at the openings.

5. In a snap fastener socket, in combination, spaced discs forming a housing, tubular sewing passages extending through said housing, and a retaining spring bent in and out to pass between the walls of adjacent passages.

6. In a snap fastener socket, in combination, a housing, tubular thread passages extending through said housing, and a U-shaped retaining spring in said housing, the bight of said spring embracing the walls of one of said passageways to anchor it.

7. In a snap fastener socket, in combination, a housing, a tubular thread passage extending through said housing, and a retaining spring in said housing, said spring partly encircling the wall of said passageway to anchor it in place.

8. In a snap fastener, in combination, a stud, and a retaining spring for engaging said stud, the stud engaging portion of said spring being curved in more than one plane.

9. In a snap fastener, in combination, a stud having a conical portion, and a retaining spring curved in a plane normal to the stud axis, said spring being also curved in another plane to secure line contact with said stud.

10. In a snap fastener, a stud and a retaining spring shaped for line contact, the line of contact being curved in a plurality of planes so as not to lie all in any one place.

11. In a snap fastener, a stud and retaining spring shaped for two line contacts, each line contact lying outside of a plane containing part or all of the other and in another plane.

12. In a snap fastener, a stud having reversely tapered portions, and a spring curved in two planes or directions at right angles to each other for line contact with the portion shaped to hold the stud in place and point contact with the other portion.

13. In a snap fastener stud member, a central stud, a peripheral rim, a disc-like web uniting said stud and rim, the portion of said web adjacent said rim being apertured to receive fastening threads, and the portion inside said apertures being struck up into structural shapes to increase the rigidity of the web.

14. In a snap fastener stud member, a central stud, a peripheral rim, a disc-like web uniting said stud and rim, the portion of said web adjacent said rim being apertured to receive fastening threads, and the portion inside said apertures being struck up into structural shapes to increase the rigidity of the web, the apertured portion of said web being depressed to form an annular thread-housing channel.

15. In a snap fastener stud member, a central stud, a peripheral rim, a disc-like web uniting said stud and rim, the portion of said web adjacent said rim being apertured to receive fastening threads, and the portion inside said apertures being struck up into structural shapes to increase the rigidity of the web, the apertured portion of said web being depressed to form an annular thread-housing channel, said structural shapes lying in radial alignment with said apertures.

16. In a snap fastener stud member, a central stud, a peripheral rim, a disc-like web uniting said stud and rim, the portion of said web adjacent said rim being apertured to receive fastening threads, and the portion inside said apertures being struck up into structural shapes to increase the rigidity of the web, the apertured portion of said web being depressed to form an annular thread-housing channel, said structural shapes occupying only those areas of said inside portion in alignment with said apertures.

17. In a snap fastener stud member, a central stud, a peripheral rim, a disc-like web uniting said stud and rim, the portion of said web adjacent said rim being apertured to receive fastening threads, and the portion inside said apertures being struck up into structural shapes to increase the rigidity of the web, said structural shapes lying in radial alignment with said apertures.

18. In a stud member adapted to cooperate with a socket member in forming a snap-fastener, an annular rim having a reinforced upstanding flange about the outer periphery thereof, a plurality of radial connecting members on the inner periphery thereof, a stud member concentric with said annular rim and supported by said radial connecting members, said connecting members having one portion thereof formed into vertical ribs with side reinforcing members to constitute a substantial support for said concentric stud.

19. In a snap-fastener, a socket member and a stud member adapted to be sewed to carrying members, said socket member being formed out of a pair of discs, said socket member being provided with an annular groove with a plurality of holes formed therein, said holes adapted to receive the thread so as to prevent bulging from said annular groove, said pair of discs being formed where said holes are provided so that the respective edges of the holes meet for forming a closed housing and for increasing the strength of the socket member.

In witness whereof, I hereunto subscribe my name this 6th day of April 1922.

JULIUS C. PETERSON.